(12) United States Patent
Rakowski et al.

(10) Patent No.: US 6,668,574 B2
(45) Date of Patent: Dec. 30, 2003

(54) REFRIGERATION MANIFOLD

(75) Inventors: Tom J. Rakowski, Northbrook, IL (US); Miles J. Dubinsky, Carol Stream, IL (US); James A. Terry, Indianapolis, IN (US)

(73) Assignee: Stride Tool, Inc., Ellicottville, NY (US)

( * ) Notice: Subject to any disclaimer, the term of this patent is extended or adjusted under 35 U.S.C. 154(b) by 0 days.

(21) Appl. No.: 10/303,579

(22) Filed: Nov. 25, 2002

(65) Prior Publication Data

US 2003/0131622 A1 Jul. 17, 2003

Related U.S. Application Data

(63) Continuation-in-part of application No. 10/044,891, filed on Jan. 11, 2002, now abandoned, and a continuation-in-part of application No. 10/044,607, filed on Jan. 11, 2002, now Pat. No. 6,484,526.

(51) Int. Cl.$^7$ ................................................ F25B 45/00
(52) U.S. Cl. ............................................. 62/292; 62/77
(58) Field of Search ........................... 62/292, 149, 77, 62/475

(56) References Cited

U.S. PATENT DOCUMENTS

| | | |
|---|---|---|
| 3,785,163 A | 1/1974 | Wagner |
| 3,916,641 A | 11/1975 | Mullins |
| 5,558,124 A | 9/1996 | Randall |
| 5,638,689 A | 6/1997 | Scaringe et al. |
| 5,715,692 A | 2/1998 | Pappas |
| 5,819,775 A | 10/1998 | Holloway |
| 6,484,526 B2 | 11/2002 | Terry |

OTHER PUBLICATIONS

Copy of International Search Report dated May 31, 2002 for PCT/US02/02095.

*Primary Examiner*—Chen Wen Jiang
(74) *Attorney, Agent, or Firm*—Watts Hoffmann Co., LPA (57) ABSTRACT

A manifold for charging a system which when in use cycles a refrigerant between liquid and gaseous states is disclosed. The manifold includes a housing defining a flow passage extending from an inlet to an outlet. Structure is within the housing to define a capillary in parallel communication with a section of the passage. A refrigerant state control valve is connected to the housing. The valve, when in the open position, enables concurrent refrigerant flow through both the section of the passage and the capillary to charge such a system with refrigerant in a liquid state. The valve when in the closed position sufficiently blocks the section of the passage to cause all refrigerant flow to be through the capillary thereby to enable charging such a system with refrigerant in a gaseous state.

29 Claims, 6 Drawing Sheets

REFRIGERATION MANIFOLD

This application is a continuation in part of Ser. No. 10/044,891 filed Jan. 11, 2002 now abandoned under the title Refrigeration Manifold and Ser. No. 10/044,607 filed Jan. 11, 2002 under the title Manifold Gauge Assembly now U.S. Pat. No. 6,484,526B2 issued Nov. 26, 2002.

TECHNICAL FIELD

This invention relates to manifolds for servicing refrigeration, air conditioning, and heat pump systems, which in operation effect heat transfer through cyclically changing a refrigerant between liquid and vapor states.

BACKGROUND ART

Many air conditioning, refrigeration and heat pump systems utilize refrigerants to effect heat transfer. Typically, the refrigerant is from a class of fluids known as freon. The heat transfer is effected by compressing a refrigerant in its gaseous state to liquefy it and in the process release heat energy. In the case of refrigeration or air conditioning a heat exchanger dissipates the released heat to an ambient atmosphere. The liquid refrigerant is flowed to another heat exchanger which is in heat absorbing relationship with a space to be cooled. The refrigerant is allowed to expand and vaporize to absorb heat via the second heat exchanger.

In a refrigerator, for example, a compressor unit disposed outside a refrigerated compartment, is used to compress the refrigerant from its vapor state to a liquid state and thereby dispel heat to the ambient atmosphere. Liquid refrigerant is delivered to a cooling heat exchanger in communication with an atmosphere within the refrigeration chamber. The refrigerant is allowed to vaporize within the cooling heat exchanger and thereby absorb heat from the atmosphere within the chamber.

The systems which use refrigerant for heat transfer from time to time must be serviced by a process known as charging. With the charging process, a manifold is connected to the system being recharged and to a source of refrigerant. When the system is being fully recharged it typically is evacuated and then the refrigerant is delivered in liquid form via the manifold to the system. For top-off, the refrigerant is charged in its vapor state.

Heretofore, such recharging has typically used a manifold for recharging. The manifold has high side and low side outlets which are respectively connected to the high or liquid side and the low or vapor side of a compressor. For primary recharging, when the recharging is done properly, the low side outlet is closed, a source of liquid refrigerant is connected to an inlet to the manifold and the high side is charged to a desired level. Once the primary recharging has been completed, the high side or liquid outlet is closed and the vapor side is opened. Refrigerant is fed through a vaporizing restrictor connected in series with the manifold. The compressor is energized to cause it to liquefy vapor from the low side and deliver liquid refrigerant to the high side. Top-off is then achieved by delivering vapor to the low side of the system being charged.

Accordingly, there has been a need for a recharging manifold system which can effect primary recharging utilizing liquid refrigerant and top-off with vaporized refrigerant without use of a manifold and a restrictor in series with it.

SUMMARY OF THE INVENTION

In its preferred form, a mechanism embodying the present invention includes a manifold. The manifold has a housing defining an inlet and two outlets. One of the outlets is intended to be connected to the so-called high side of a system being charged, while the other outlet is intended to be connected to the so-called low side. The high side is that portion of the system being charged in which refrigerant is contained in its liquid state, while the low side contains refrigerant in its vapor state.

The manifold has an inlet for connection to a source of refrigerant which under current mandates is always in a liquid state. Internal passages in the manifold communicate the supply inlet with a state control arrangement embodying novel features of the present invention. Other internal manifold passages communicate the arrangement with the outlets. A pair of outlet control valves are provided, each associated with a different one of the outlets for selectively establishing and interrupting communication between manifold passages and the associated outlet.

The state control arrangement includes a capillary in parallel communication with a section of the inlet passage. A charging flow phase control valve is provided. The phase control valve has an open position allowing flow of liquid refrigerant from the inlet through both the passage section and the capillary to the outlets. The phase control valve has a closed position shutting off flow through the passage section while permitting flow through the capillary. When the phase control valve is closed, flow through the capillary results in the refrigerant being vaporized.

In a process of recharging a system, the novel and improved manifold is connected to the system to be charged. The high side and phase control valves are placed in open conditions. Refrigerant in liquid form is fed through the inlet opening thence through both the passage section and the capillary and then to and through the high side outlet to the system being charged to deliver refrigerant in liquid form. When it is desired to fill or to top-off with refrigerant in vaporized form, one simply closes the phase control valve and the high side outlet valve. The low side outlet valve is opened and further refrigerant flows from the inlet through the capillary where the refrigerant is vaporized and hence through the low side outlet into the system being charged. Concurrently the systems compressor is operated to top off the system high side while the input vapor tops off the low side.

When the system is used with refrigerants in older systems, top off is enhanced because the refrigerant is supplied in vapor form and the phase control valve is open.

Accordingly, the objects of the invention are to provide a novel and improved refrigerant manifold and a process of recharging systems utilizing refrigerant.

BEST MODE FOR CARRYING OUT THE INVENTION

Figure 1:
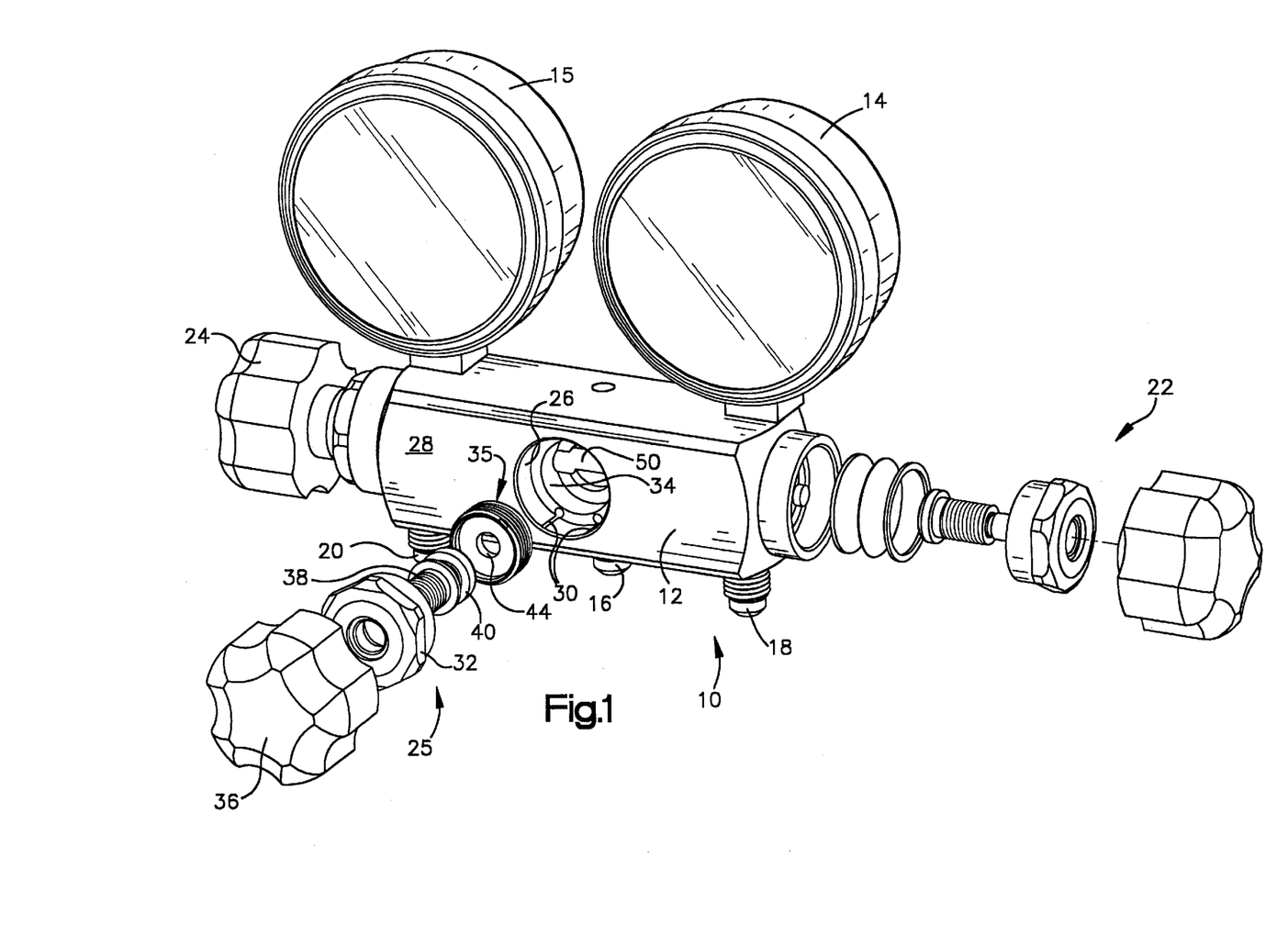
FIG. 1 is an exploded view of one embodiment of a manifold device embodying the present invention.

Referring to the drawings and to FIG. 1 in particular, an embodiment which is now an alternate embodiment is shown. In this embodiment a manifold is shown generally at 10. The manifold includes a housing 12. High and low side pressure gauges 14, 15 are carried by the housing. The gauges supply pressure readings of high and low sides of a connected heat transfer system.

The manifold 10 includes an inlet 16 for connection to a supply of refrigerant, typically a freon compound. The manifold also includes high and low side outlets 18, 20 for delivering refrigerant to a connected system. High and low side outlet control valves 22, 24 are connected to opposite ends of the elongate manifold 12 for selectively establishing and interrupting fluid communication from outlet passages within the manifold to the respective outlets 18, 20.

A refrigerant state control assembly is shown generally at 25. A counter bore 26 is provided centrally of the manifold 12 in a manifold face 28 which is the forward face as viewed in FIG. 1. A pair of drilled holes 30 are provided at the base of the counter bore 26. The drilled holes 30 are passages in direct communication with the inlet 16 for providing liquid refrigerant into a space defined by the counter bore and the state control assembly 25.

The assembly 25 includes a mounting fitting 32 which is threadedably received in the counter bore 26 to secure the assembly 25 to the manifold. An O ring is provided to effect a seal between the fitting 32 and the housing 12. While not visible in other of the drawings, such an O ring is shown at 33 and 33' in FIGS. 3 and 10. The manifold also includes a second and reduced size counter bore 34. The second counter bore 34 is axially aligned and in communication with the counter bore 26. A capillary ring or annulus 35 is positioned within the second counter bore 34 and seated against the base of the counterbore 34.

The assembly 25 includes a knob 36 connected to a valve stem 38. Rotation of the knob 36 and the connected stem 38, shifts a valve member 40 into and out of engagement with a face surface 42 of the annulus 35. Coaction of the valve member 40 and the face surface 42 selectively establishes and interrupts flow communication through an outlet passage 44 formed in the annulus 35. The outlet passage 44 is coaxial with the annulus 35.

In its presently preferred form, the annulus 35 has a perimetral helix 46 which is in close association with the walls defining the second counter bore 34. The walls of the counter bore 34 and the helix 46 coact to provide a helical passage 48 in the perimeter of the annulus 35. The helical passage 48 provides fluid communication between the inlet holes 30 and a central, state control outlet 50 provided at a base of the second counter bore 34. The state control outlet 50 communicates via internal passages in the manifold 12 with the high and low side outlets 18, 20.

Figure 6:
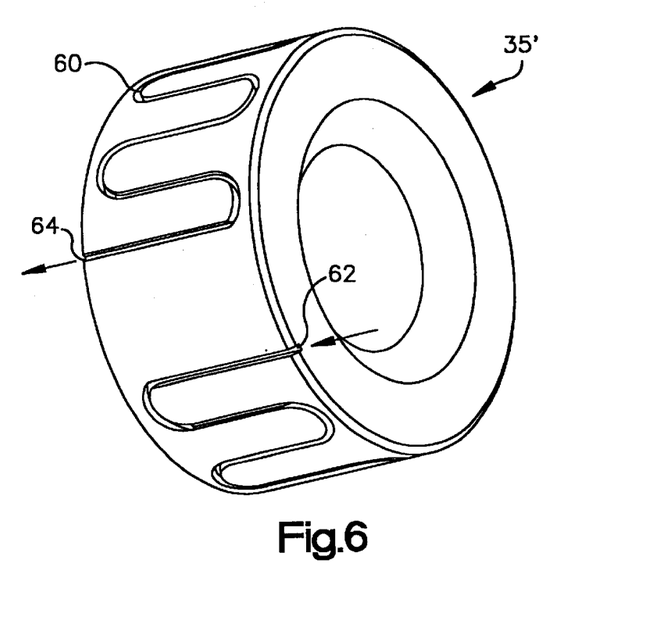
FIGS. 6 through 9 are alternate embodiments of the annulus showing alternate capillary passages.
Figure 7:
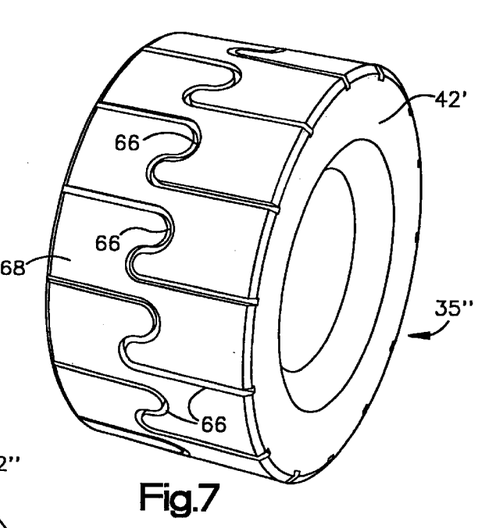
Figure 8:
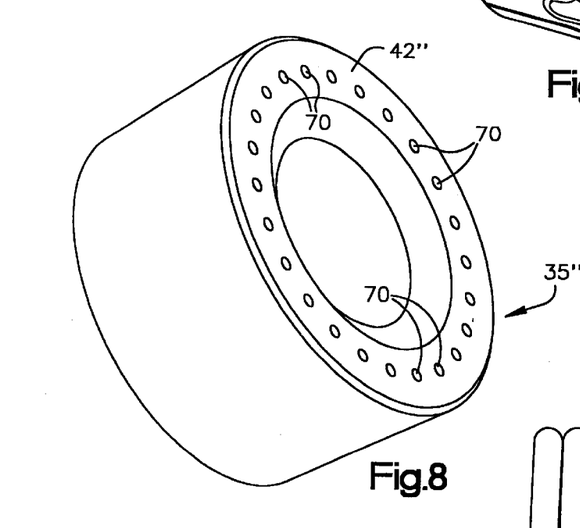
Figure 9:
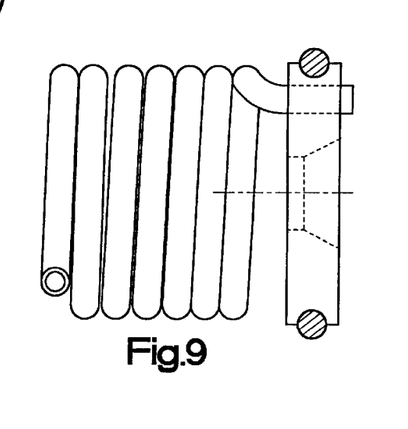

In FIGS. 6 through 8, alternate annuli 35', 35", 35'" are shown. In the embodiment of FIG. 6, a sinusoidal helical groove 60 is provided. The groove extends from an inlet 62 around the perimeter of the annulus 35' to an outlet at 64. FIG. 9 shows a further alternate capillary system in the form of a helically wound tube.

In the embodiment of FIG. 7, a plurality of generally S-shaped grooves 66 are provided. Each of these grooves extends from an inlet adjacent the face surface 42' across an outer surface 68 of the annulus 35" to an outlet at an axially opposite face of the annulus. The annuli 35' and 35", like the annulus 35, have perimetral grooves that coact with the cylindrical surface of the second counter bore 34 to define capillary paths.

In the embodiment of FIG. 8, a plurality of capillary passages 70 extend through the annulus 35'". The passages 70 each have an axis which parallels the axis of the annulus 35'" so that capillary flow is from the face 42'" to an opposite face through each of the passages 70.

Figure 2:
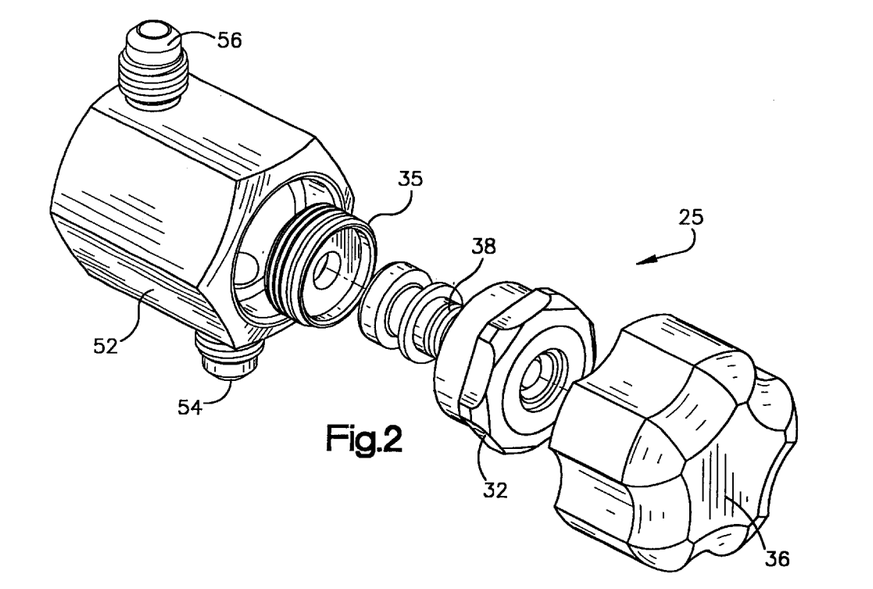
FIG. 2 is an exploded view of a retrofit embodiment embodying the present invention.
Figure 3:
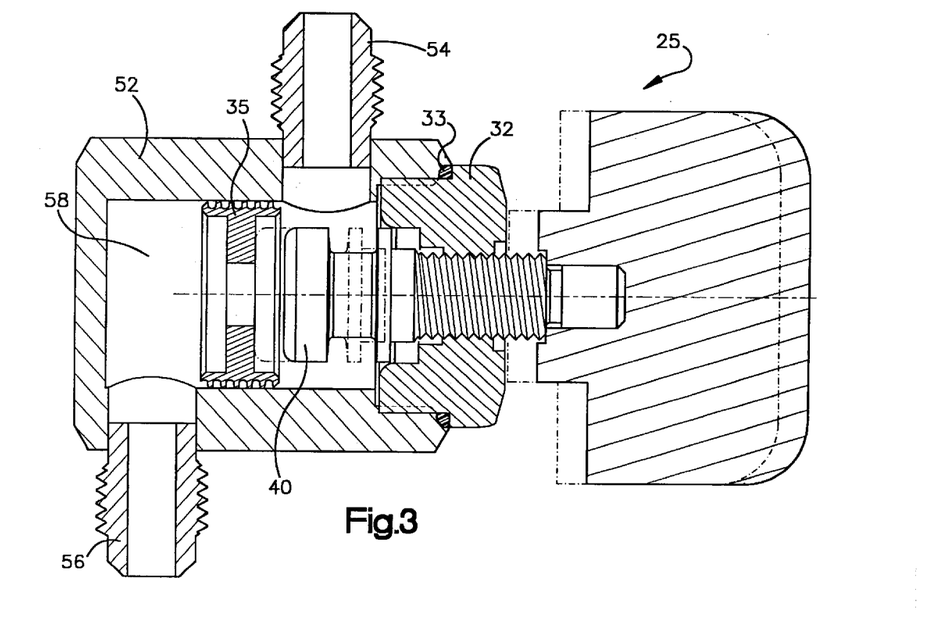
FIG. 3 is a partially sectioned view of the embodiment of FIG. 2.
Figure 4:
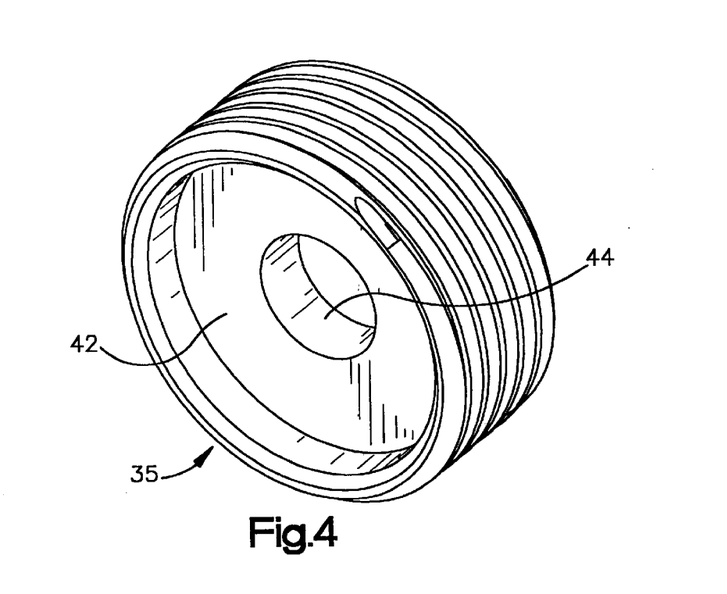
FIG. 4 is a perspective view on an enlarged scale of the capillary ring or annulus preferably used in all embodiments.
Figure 5:
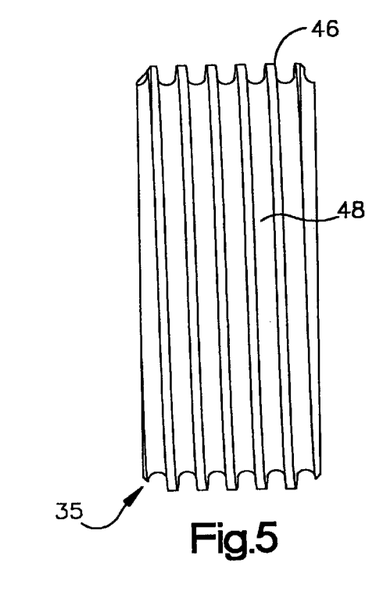
FIG. 5 is an elevational view of the capillary ring.
Figure 10:
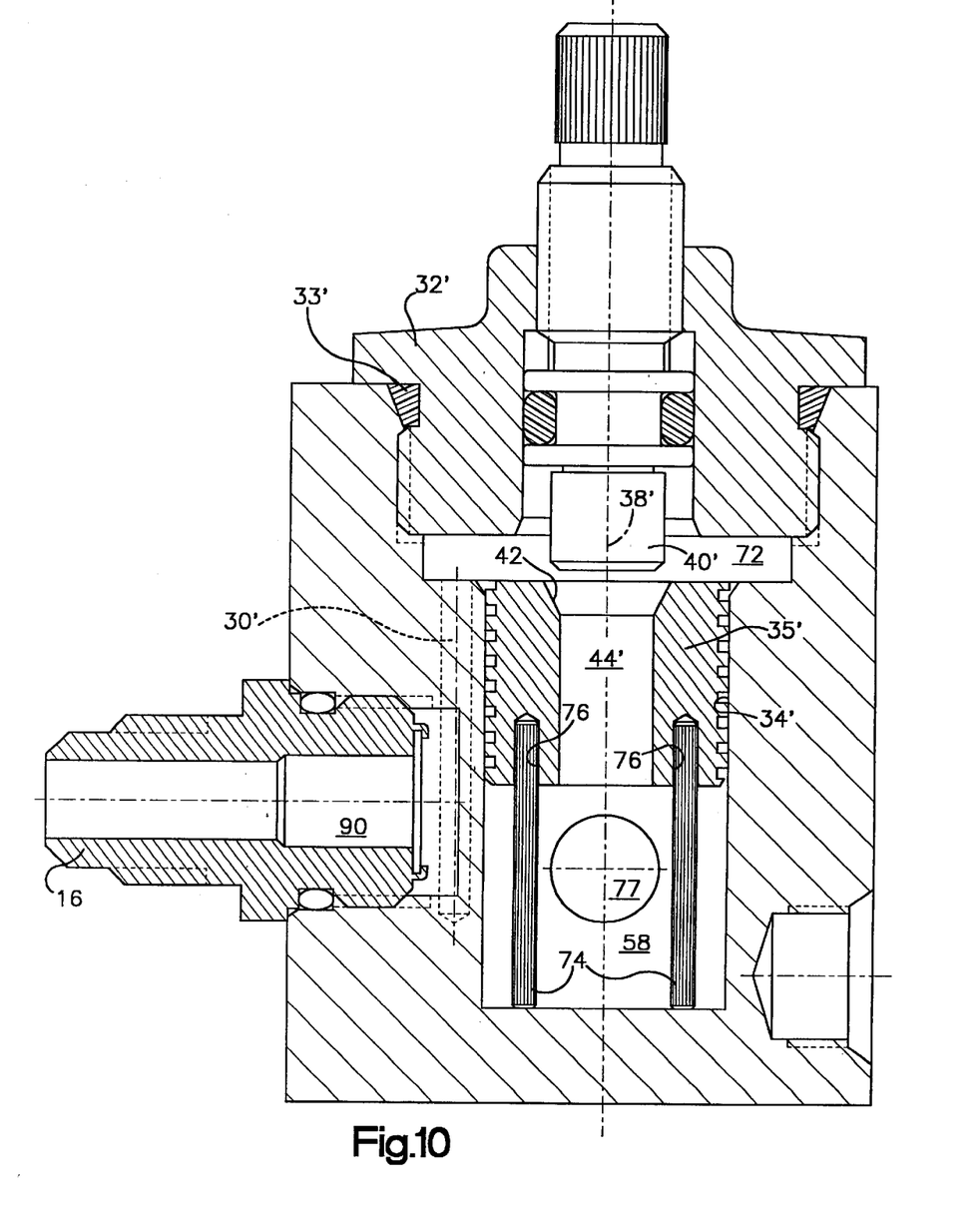
FIG. 10 is a cross sectional view of the now preferred construction.
Figure 11A:
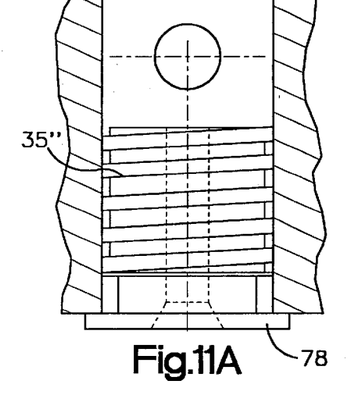
FIGS. 11A–D are fragmentary cross sectional views of alternate arrangements for maintaining the capillary annulus in appropriate axial positions; and, FIG. 12 is a sectional view of a check valve equipped embodiment for use in vacuum applications.
Figure 11B:
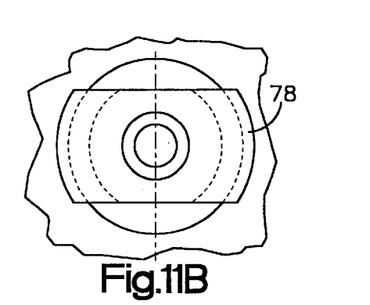

Referring now to FIGS. 2 and 3, a retrofit unit is shown. The retrofit unit is designed for connection to an existing prior art charging manifold to convert it to a manifold which can be used for charging refrigerant into a system either in liquid or vapor state. The retrofit unit includes a housing or body 52. An inlet 54 is provided for a connection to a source of refrigerant. A refrigerant state control assembly 25, which is identical to the assembly of FIG. 1, is provided. The assembly 25 includes the mounting fitting 32 which is connected to the body 52. The valve member 40 coacts with the annulus 35 in a manner identical to the coaction in the embodiment of FIG. 1 except that a selected one of the props of FIGS. 10 and 11 is used but not shown. An outlet fitting 56 is connected to the body 52 and in fluid communication with the outlet of the refrigerant state control assembly. The outlet fitting 56 is adapted for connection to an inlet of a conventional and prior art manifold.

When the valve member 40 is seated against the face surface 42, the helical passage 48 functions as a capillary converting liquid refrigerant to its vapor state. An outlet from the capillary communicates with an expansion space 58, visible in FIGS. 3 and 10 a corresponding expansion chamber, not shown, is within the manifold body or housing 12 of FIG. 1. The expansion space assures full vaporization of the refrigerant. Similarly, the pair of small inlet holes or passages 30 rather than a single hole of comparable cross-sectional area contribute to the efficient operation of the capillary action to assure full vaporization.

Referring now to FIG. 10, a now preferred embodiment is shown: In this embodiment like reference numerals to the numerals used in connection with the FIG. 1 embodiment are used with primes added where there are differences. In this embodiment, refrigerant is introduced through the inlet 16 and is directed through two passages 30', only one of which is shown in FIG. 10, to a space 72 above the capillary annulus 35'.

The annulus 35' is positioned in a bore 34' as distinguished from the counter bore 34 of FIG. 1. This modification eliminates a shoulder against which the annulus of FIG. 1 rests and thus omits a source of turbulence in fluid flow as refrigerant gasses exit the capillary. In order to maintain position of the annulus 35', a pair of props 74 are provided. These props are interposed between bores 76 in the annulus and the base of the bore 34' and thus extend through an expansion space which is below the annulus 35' and in communication with an outlet 77. The outlet extends in both directions from the expansion space to communicate with the outlets 18, 20.

Figures 11C, 11D:
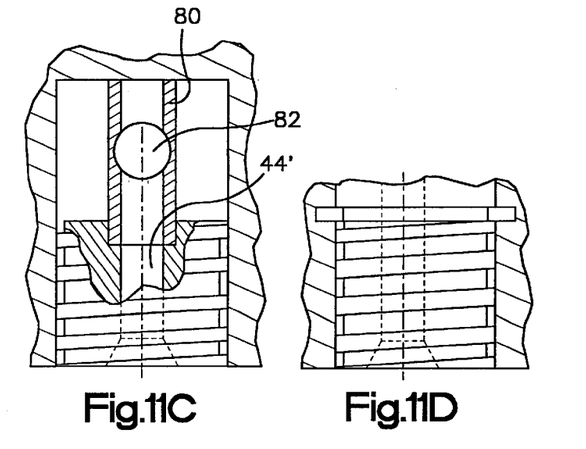

FIGS. 11a–d show alternate arrangements for the props 74 to maintain the capillary in position against closing forces of the valve member 40'. Specifically in FIG. 11a and 11b a cap extension 78 of the capillary 35" overlies the base of the space 44. In the embodiment of FIG. 11, a tube 80 replaces the prop 74. The tube is in communication with the annulus central passage 44' and has a cross bore or ground away side portions to provide outlet ports 82. In FIG. 11*d* a snap ring 84 provides a seat for the annulus 35'''.

Figure 12:
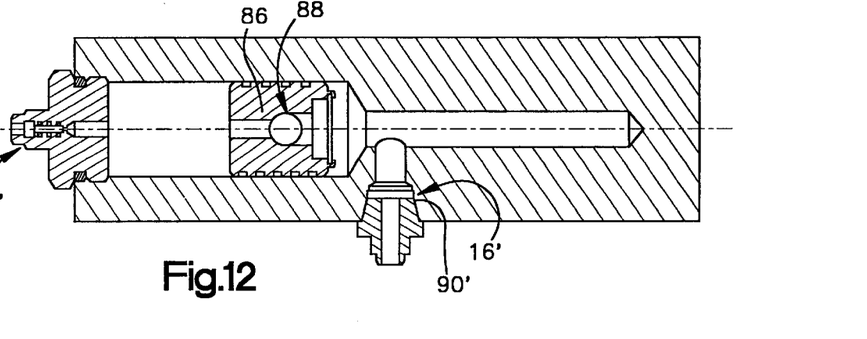

In FIG. 12 a further alternate embodiment is shown. Here a capillary annulus carries a check valve 88. When liquid is being charged the flow is from the inlet 16' to a high side outlet, not shown. The low side outlet 20' will be closed at that time. When it is desired to provide refrigerant vapor to the low side, the high side outlet is closed, the low side outlet 20 prime is opened and a flow occurs around the capillary 86 but not through its axial passage because of the presence of the check valve 88. When it is desired to draw a vacuum on the system the check valve 88 will open allowing the low side to be evacuated as well as the high side.

OPERATION

In operation with current refrigerants the device of FIG. 1, the inlet fitting 16 is connected to a source of refrigerant in its liquid state. The high and low side outlets 18, 20 are respectively connected to a system being charged typically following evacuation of that system. The high side valve 22 is opened as is the valve of the refrigerant state control assembly 25. The low side valve 24 is closed.

Liquid refrigerant is fed from the inlet 16 through a filter 90, FIG. 10, to the supply holes 30. While not shown in the drawings all inlets and outlets of all embodiments are preferably similarly equipped with filters. The refrigerant then flows primarily through the axial passage 44 and also through the capillary helical passage 48 to the expansion chamber 58, 58' and thence through the outlet 50 or 77. Refrigerant flows from the outlet 50 or 77 through internal passages in the manifold to the high side outlet 18. Flow is continued until a predetermined quantity of refrigerant has been supplied to the high side of a system being charged.

Once the predetermined quantity of refrigerant has been charged into the system high side, the knob 36 is rotated to bring the valve member 40, 40' into flow interrupting contact with the annulus face 42, 42'. The high side valve 22 is closed and the low side valve 24 is opened. The compressor of the system being charged is energized to cause the compressor to operate. Thereafter, flow continues but only through the helical passage 48 which functions as a capillary to change the refrigerant being charged from its liquid to its gaseous state. Vapor charging continues until the system is fully charged.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. A device for charging a system which when in use cycles a refrigerant between liquid and gaseous states, the device comprising:
    a) a housing defining a flow passage extending from an inlet to high and low side outlets;
    b) structure within the housing defining a capillary in parallel communication with a section of the passage;
    c) a valve connected to the housing and having open and closed positions;
    d) the valve when in the open position enabling concurrent refrigerant flow through both the section of the passage and the capillary to the high side outlet whereby to charge such a system with refrigerant in a liquid state; and,
    e) the valve when in the closed position sufficiently blocking said section of the passage whereby substantially all refrigerant flow is through the capillary thereby to enable charging such a system through the low side outlet with a refrigerant in a gaseous state.

2. The device of claim 1 wherein the structure is an annular ring having a perimetral surface defining a capillary flow path.

3. The device of claim 2 wherein the flow path is helical.

4. The device of claim 2 wherein the flow path is sinusoidal.

5. The device of claim 2 wherein there are a plurality of generally S-shaped flow paths.

6. The device of claim 1 wherein the structure includes a plurality of through capillary passages.

7. The device of claim 1 wherein the housing is connectable to a manifold.

8. The device of claim 1 wherein the housing is a manifold housing.

9. The device of claim 8 wherein the manifold housing has high side and low side outlets and a pair of outlet valves are provided, each outlet valve being adapted to close an associated and different one of the outlets.

10. The device of claim 8 wherein the manifold housing has inlet and outlet connector portions for facile connection between a source of refrigerant and such a system.

11. The device of claim 1 wherein the structure is an annulus defining the capillary and the section of the flow passage.

12. The device of claim 11 wherein the capillary is defined by a helix formed on a perimetral surface of the annulus.

13. A process of charging a heat exchange mechanism with refrigerant comprising:
    a) connecting an inlet of a manifold to a source of liquid refrigerant;
    b) connecting outlets of the manifold to high and low sides of the mechanism;
    c) opening a phase control valve to establish liquid refrigerant communication through a now open passage to at least one of the outlets;
    d) introducing refrigerant under pressure to the manifold to establish refrigerant flow through both the open passage and a parallel capillary;
    e) subsequently closing the phase control valve to shut off a principle liquid flow path through the passage to at least a selected one of the outlets; and,
    f) continuing the charging with flow through the capillary to produce vaporized refrigerant until a desired quantity of refrigerant has been charged into the mechanism.

14. The process of claim 13 wherein outlet control valves are provided and at least one of the outlet control valves is closed to prevent flow through the at least one valve during at least a portion of the charging.

15. The process of claim 14 wherein said at least outlet control valve controls the outlet connected to the mechanism high side.

16. The process of claim 13 wherein the continued charging with vaporized refrigerant includes flowing the refrigerant through a capillary.

17. The process of claim 16 wherein the flow of liquid refrigerant when the phase control valve is open is through both the principle flow path and the capillary.

18. A valving mechanism for use in charging a heat exchange system comprising:

a) an annulus defining a through main flow control passage and surfaces defining a capillary path;
b) the annulus being adapted to be mounted within a housing;
c) a valve member adapted to sealingly engage the annulus in a closed position to close off the main passage in a member closed position and to be spaced from the annulus in a valve open position;
d) the member also being mountable in such housing whereby the mechanism will permit liquid refrigerant flow through the passage and the capillary when the member is in the open position and vapor flow through and from the capillary when the member is in the closed position;
e) the mechanism including a member control operable connected to the valve member for maintaining the member in its open and its closed positions selectively and one at a time.

19. A housing in combination with the mechanism of claim 18 wherein the housing includes an inlet device for connection to a supply of refrigerant and an outlet for connection to a recharging manifold.

20. A housing in combination with the mechanism of claim 18 wherein the housing is a manifold having an inlet and a pair of outlets and passages connecting the inlet and the outlets with the mechanism.

21. The mechanism of claim 18 wherein the surfaces are perimetral surfaces.

22. A manifold system for charging a heat exchange system with a fluid cyclically changeable between liquid and gaseous states comprising:
a) a housing having an inlet and high and low side outlets;
b) the housing having a pair of axially aligned and communicating counter bores;
c) the housing including an inlet passage communicating the inlet with the counter bores and a pair of outlet passages respectively communicating the counter bores with the outlets;
d) a pair of pressure gauges respectively in communication with the outlet passages;
e) an annulus mounted in an inner one of the counter bores;
f) the annulus including a through main passage and perimetral surfaces defining a groove, the perimetral surfaces being in close complemental relationship with a wall defining the inner counter bore whereby the groove and the wall define a further passage;
g) a state control valve having a mounting collar threadably engaging a wall of the outer one of the counter bores to connect the control valve to the manifold;
h) the control valve also including a valve member mounted on an axially moveable stem for selectively permitting and preventing flow through the main passage; and,
I) the groove functioning as a capillary when the control valve prevents flow through the main passage.

23. The system of claim 22 wherein the groove is a helix.

24. The system of claim 22 further including an expansion chamber for receiving out put from the capillary when the system is in use.

25. The system of claim 24 wherein the chamber is in communication with the low side outlet when the system is in use.

26. A manifold for charging a heat exchange system with refrigerant comprising:
a) structure defining an inlet;
b) the structure also defining high and low side outlets and passageways between the inlet and the outlets;
c) high and low side valves connected to the structure, the valves respectively being for selectively opening and closing the high and low side outlets;
d) the passageways including a liquid flow path extending from the inlet to the high side outlet;
e) the passageways also including a vapor flow path including a capillary, the vapor flow path extending from the inlet to both the high and the low side outlets; and,
f) a flow control valve connected to the structure for selectively closing the liquid flow path.

27. The manifold of claim 26 wherein the capillary is an annulus having a perimetral capillary flow path.

28. The manifold of claim 26 wherein the vapor flow path includes an expansion chamber for receiving output from the capillary.

29. The manifold of claim 28 wherein the chamber is in communication with the low side outlet when the system is in use.

* * * * *